United States Patent
Yamashita et al.

(10) Patent No.: US 7,460,947 B2
(45) Date of Patent: Dec. 2, 2008

(54) POWER GENERATION CONTROL SYSTEM AND METHOD

(75) Inventors: Yukihiro Yamashita, Takahama (JP); Makoto Miwa, Kariya (JP); Daiji Isobe, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 170 days.

(21) Appl. No.: 11/500,469

(22) Filed: Aug. 8, 2006

(65) Prior Publication Data
US 2007/0029800 A1   Feb. 8, 2007

(30) Foreign Application Priority Data
Aug. 8, 2005   (JP)   ............... 2005-229038

(51) Int. Cl.
- G06F 17/00 (2006.01)
- F02D 29/06 (2006.01)
- F02D 41/14 (2006.01)

(52) U.S. Cl. ............ 701/109; 701/103; 701/104; 290/40 C (58) Field of Classification Search ........... 701/101, 701/103, 104, 109; 60/285, 698, 716; 320/137, 320/161; 180/65.2–65.6; 903/905, 906, 903/941, 942, 943; 290/40 C
See application file for complete search history.

(56) References Cited

U.S. PATENT DOCUMENTS

| | | | | |
|---|---|---|---|---|
| 5,495,906 A | * | 3/1996 | Furutani | ............ 180/65.2 |
| 6,301,529 B1 | * | 10/2001 | Itoyama et al. | ............ 701/22 |
| 6,429,613 B2 | * | 8/2002 | Yanase et al. | ............ 318/139 |
| 6,480,767 B2 | * | 11/2002 | Yamaguchi et al. | ............ 701/22 |
| 6,563,230 B2 | * | 5/2003 | Nada | ............ 290/40 C |
| 6,621,250 B1 | | 9/2003 | Ohkubo et al. | |
| 6,784,563 B2 | * | 8/2004 | Nada | ............ 290/40 C |
| 6,792,750 B2 | * | 9/2004 | Nagai et al. | ............ 60/285 |
| 6,892,541 B2 | * | 5/2005 | Suzuki | ............ 60/706 |
| 7,024,859 B2 | * | 4/2006 | Jayabalan et al. | ............ 60/716 |
| 2005/0088148 A1 | * | 4/2005 | Kubo et al. | ............ 320/137 |

FOREIGN PATENT DOCUMENTS

JP   2000-4502   1/2000

* cited by examiner

*Primary Examiner*—Willis R. Wolfe, Jr.
*Assistant Examiner*—Johnny H. Hoang
(74) *Attorney, Agent, or Firm*—Nixon & Vanderhye P.C.

(57) ABSTRACT

A control unit uses upper and lower limit guard values to limit a power generation quantity of a power generator and thereby to maintain the current combustion mode during power generation of the power generator. The control unit computes a remaining electric charge of a battery. When the remaining electric charge drops to a predetermined value or below, the control unit cancels a combustion mode maintaining operation, which maintains the current combustion mode, is cancelled, so that priority is given to the power generation of the power generator to recover the remaining electric charge of the battery. Also, when an electric power consumption in a vehicle is equal to or greater than a predetermined value, the combustion mode maintaining operation is cancelled, and the power generation quantity of the power generator is controlled in a manner that does not cause overdischarge of the battery.

21 Claims, 10 Drawing Sheets

FIG. 10

POWER GENERATION CONTROL SYSTEM AND METHOD

CROSS REFERENCE TO RELATED APPLICATION

This application is based on and incorporates herein by reference Japanese Patent Application No. 2005-229038 filed on Aug. 8, 2005.

BACKGROUND OF THE INVENTION

1. Field of the Invention

The present invention relates to power generation control system and method for an internal combustion engine of a vehicle.

2. Description of Related Art

For example, in a direct fuel injection engine (also referred to as a direct injection engine), which directly injects fuel into cylinders, a combustion mode is changed between a stratified combustion mode and a homogeneous combustion mode based on an operational condition, such as a load of the engine. Also, in a lean-burn engine, a combustion mode is changed between a stoichiometric combustion mode and a lean combustion mode based on an operational condition, such as a load of the engine. In the stoichiometric combustion mode, the air/fuel mixture gas, which is around a theoretical air/fuel ratio, is combusted. In the lean combustion mode, a lean air/fuel mixture is combusted.

Similar to a normal intake port injection engine, which does not change its combustion mode, even in these combustion mode variable engines, a power generator (an alternator), which is driven by a drive force of the engine, is provided. The electric power generated by the power generator is supplied to various electric devices, and the surplus electric power generated by the power generator is stored in a battery. In many cases, the power generation quantity of such a power generator (i.e., the quantity of electric power generated by the power generator) is controlled by controlling the control electric current (field current) of the power generator in a manner that avoids shortage of the electric charge of the battery through monitoring of the battery (see Japanese Unexamined Patent Publication No. 2000-4502 and Japanese Unexamined Patent Publication No. 2001-78365).

As described above, in the combustion mode variable engines, the combustion mode is changed based on the operational condition, such as the load. Thus, when the power generation quantity of the power generator is changed in a load range near a change boundary between the two combustion modes, the load of the engine changes in an amount that corresponds to the change in the drive torque (hereinafter, referred to as power generation toque) of the power generator, so that the combustion mode is changed. Thus, at the time of driving the vehicle at the load range around the boundary between the two combustion modes, the combustion mode may possibly be frequently changed by the change in the power generation torque. The change of the combustion mode is accompanied with the change of the engine torque. Thus, when the combustion mode is frequently changed due to the change of the power generation torque during the driving of the vehicle, the driver of the vehicle may frequently feel the torque change, thereby deteriorating the drive feeling of the driver.

SUMMARY OF THE INVENTION

The present invention addresses or alleviates the above disadvantage. According to one aspect of the present invention, there is provided a power generation control system for an internal combustion engine of a vehicle, which changes a combustion mode based on an operational condition. The power generation control system includes a power generator, a battery and a power generation control means. The power generator is driven by a drive force of the internal combustion engine to generate electric power. The battery stores the electric power, which is generated by the power generator. The power generation control means is for controlling a power generation quantity of the power generator. The power generation control means controls the power generation quantity of the power generator in a manner that maintains a current combustion mode of the internal combustion engine.

According to another aspect of the present invention, there is also provided a power generation control system for an internal combustion engine of a vehicle, which changes a combustion mode based on an operational condition. The power generation control system includes a power generator, a battery and a controller. The power generator is driven by a drive force of the internal combustion engine to generate electric power. The battery stores the electric power, which is generated by the power generator. The controller controls a power generation quantity of the power generator. The controller controls the power generation quantity of the power generator in a manner that maintains a current combustion mode of the internal combustion engine.

According to another aspect of the present invention, there is also provided a power generation control method for an internal combustion engine of a vehicle, which changes a combustion mode based on an operational condition. According to the power generation control method, the internal combustion engine is operated in one of a plurality of combustion modes. The power generator is operated in a manner that maintains the current combustion mode of the internal combustion engine.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention implemented in a direct injection engine will be described with reference to FIGS. 1 to 7. First, an entire structure of the system will be described with reference to FIG. 1.

Figure 2:
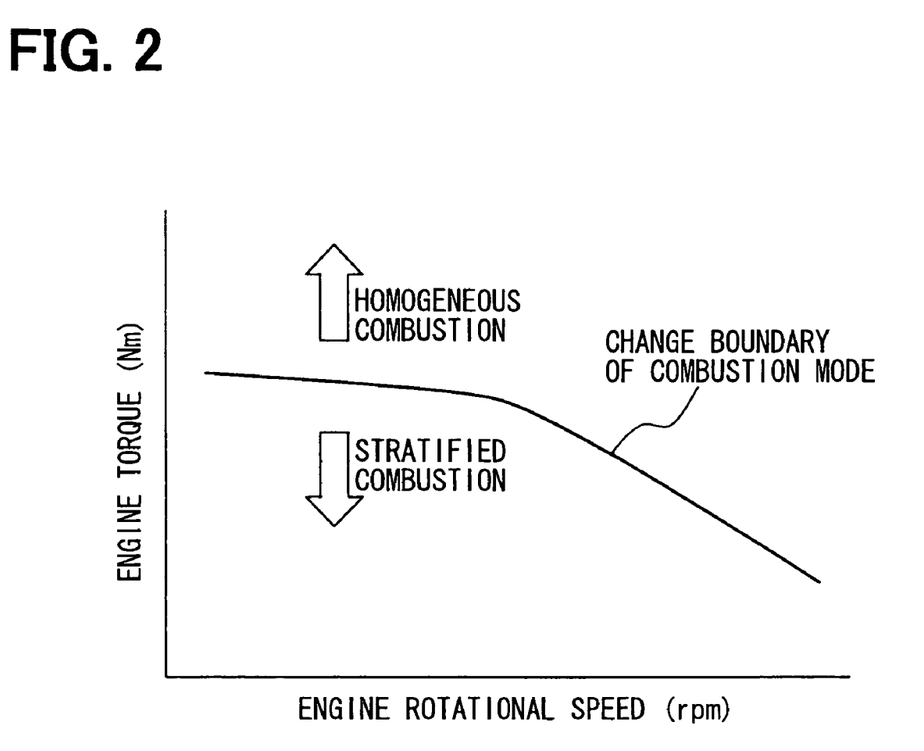
FIG. 2 is a diagram for describing a combustion mode change map.

The direct injection engine 1 (an internal combustion engine) includes a fuel injection valve 2, a spark plug 3, an ignition apparatus 4 and intake/exhaust valves 5, 6. The fuel injection valve 2 injects fuel directly into a corresponding cylinder of the engine 1. The spark plug 3 ignites the fuel/air mixture gas in the cylinder. The ignition apparatus 4 generates a spark by applying a high voltage to the spark plug 3 at the ignition timing. The intake/exhaust valves 5, 6 open and close intake/exhaust ports of the cylinder, respectively. As shown in FIG. 2, a combustion mode of the engine 1 is changed between a stratified combustion mode and a homogeneous combustion mode based on an operational condition (e.g., an engine torque and an engine rotational speed). In the stratified combustion mode, a small quantity of fuel is injected into the cylinder in a compression stroke, so that a stratified fuel/air mixture gas is formed around the spark plug 3, and this stratified fuel/air mixture gas is combusted. This stratified combustion mode improves the fuel consumption. In contrast, in the homogeneous combustion mode, the fuel injection quantity is increased, and this increased quantity of fuel is injected into the cylinder in an intake stroke, so that a homogeneous fuel/air mixture gas is generated, and this homogeneous fuel/air mixture gas is combusted. This homogeneous combustion mode improves the engine output power.

Figure 1:
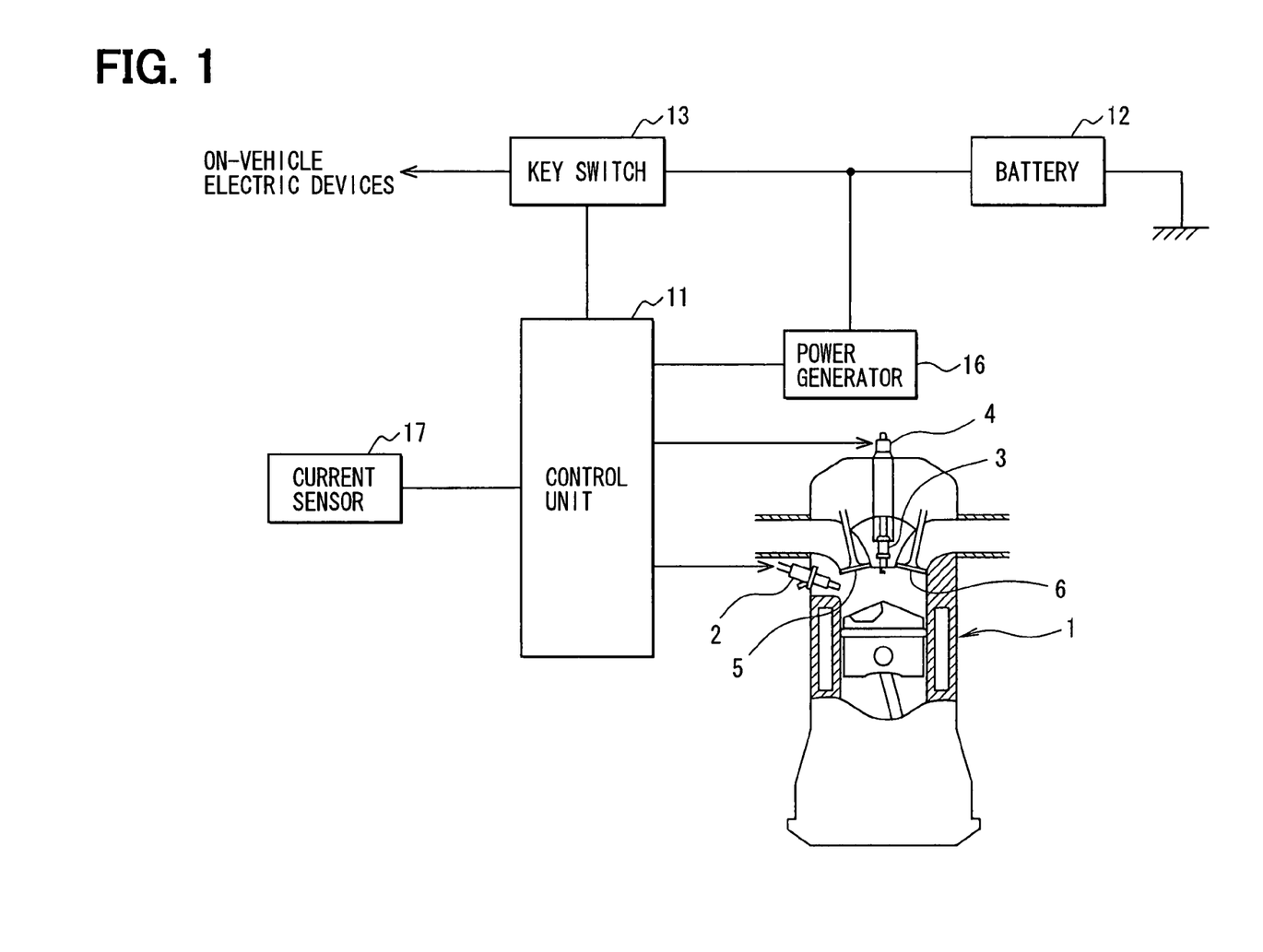
FIG. 1 is a block diagram schematically showing a structure of a system according to a first embodiment of the present invention.

The operation of the engine 1 is controlled by a control unit (a controller) 11, which receives electric power from a battery 12 through a key switch 13. More specifically, the control unit 11 controls the operation of the ignition apparatus 4 and the operation of the fuel injection valve 2. Furthermore, the control unit 11 computes a noxious component output quantity increase CEM per unit power generation quantity in a manner described below, and the control unit 11 selects a corresponding operational condition of a power generator 16 (an alternator), which results in a small noxious component output quantity increase CEM per unit power generation quantity and operates the power generator 16 to generate the power under such an operational condition. Furthermore, the control unit 11 computes a remaining electric charge SOC of the battery 12. When the remaining electric charge SOC of the battery 12 drops to a predetermined value or below, the control unit 11 gives priority to the power generation operation of the power generator 16 to recover the remaining electric charge SOC of the battery 12 even in a slightly adverse operational condition where the power generation operation of the power generator 16 causes a slight increase in the noxious component output quantity.

In such a state, in the computing process of the remaining electric charge SOC of the battery 12, a charge/discharge current of the battery 12 is measured with a current sensor 17 (a current sensing means), and the measured value is added up one after another. At this time, the charge current of the battery 12 is processed as a positive value, and the discharge current of the battery 12 is processed as a negative value. In this way, a charge/discharge current sum value is increased/decreased, i.e., is changed in consistency with the remaining electric charge SOC of the battery 12. In this way, the charge/discharge current sum value can be used as measurement data of the battery remaining electric charge SOC. Here, it should be understood that the battery remaining electric charge SOC can be computed by any other way.

Figure 3:
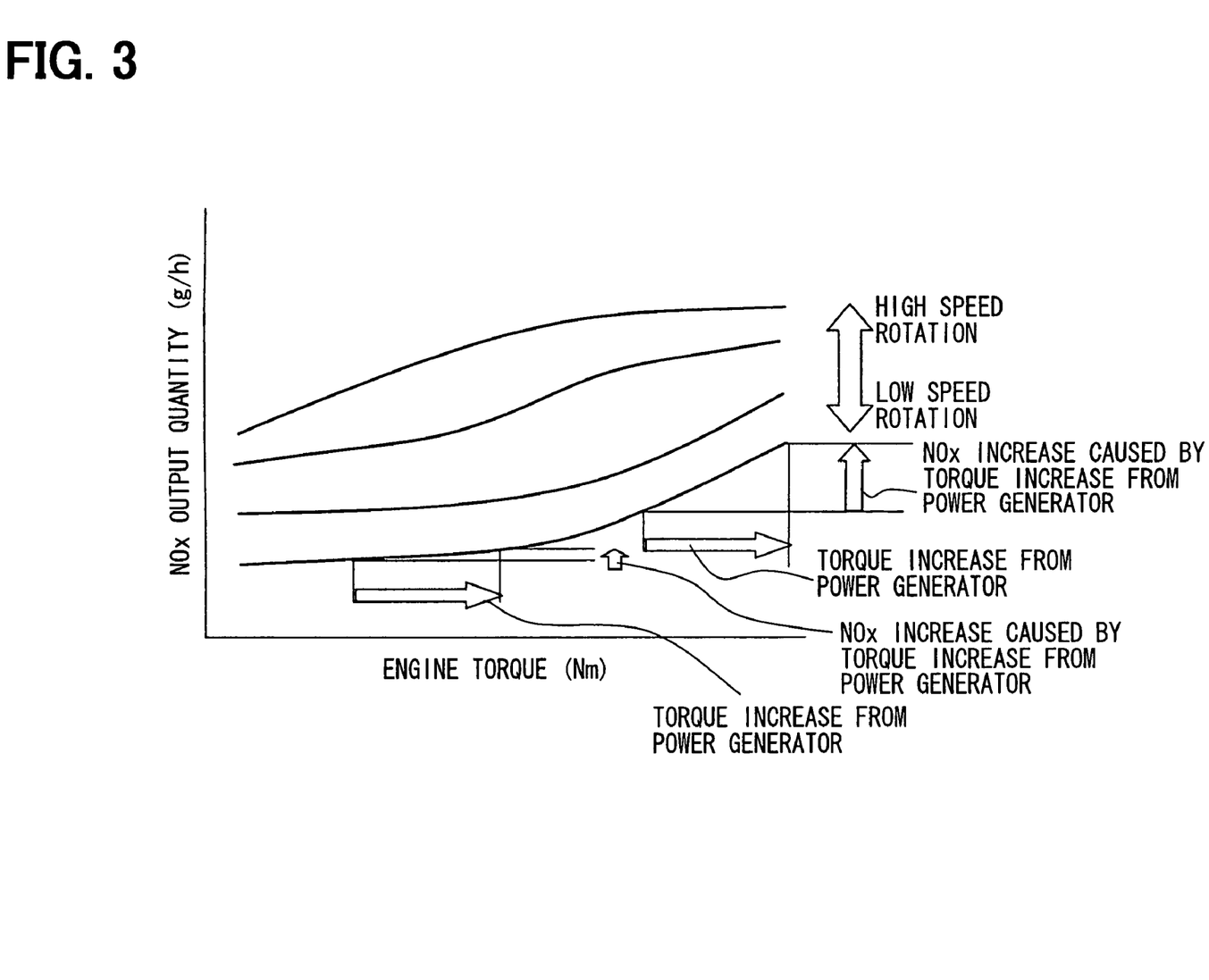
FIG. 3 is a diagram showing a relationship between an NOx output quantity and an engine operational condition.

Next, a computing method of the noxious component output quantity increase CEM per unit power generation quantity will be described. FIG. 3 is a diagram showing a relationship between an output quantity of NOx, which is a typical noxious component of the exhaust gas, and the engine operational condition. As shown in FIG. 3, the output quantity of NOx (or simply referred to as the NOx output quantity) changes according to the engine rotational speed and the engine torque. The NOx output quantity changes curvilinearly according to the engine torque. Thus, in a case of a constant engine rotational speed, an NOx output quantity large increase condition and an NOx output quantity small increase condition exist. In the NOx output quantity large increase condition, an increase in the NOx output quantity with respect to an increase in the engine torque is relatively large. In contrast, in the NOx output quantity small increase condition, an increase in the NOx output quantity with respect to the increase in the engine torque is relatively small. For example, in a case where the power generator 16 generates a constant power (a constant power generation quantity), a torque of the power generator 16 is added to the engine torque, so that an engine operating point changes. Thus, the NOx output quantity changes according to the power generation quantity of the power generator 16. At this time, only the NOx output quantity small increase condition, under which the NOx output quantity increase caused by the power generation is relatively small, is selected, and the power generation is performed under such a condition. In this way, the NOx output quantity can be reduced. Thus, in the first embodiment, the noxious component output quantity increase CEM per unit power generation quantity of the power generator 16 is computed through the following equation. Then, a condition, which achieves a small value of the noxious component output quantity increase CEM, is selected, and the power generation of the power generator 16 is performed under such a condition.

$$CEM(g/skW)=(\text{power generating time noxious component output quantity}-\text{non-power generating time noxious component output quantity})/\text{power generation quantity}$$

Here, the power generating time noxious component output quantity (g/s) is a quantity of the noxious component in the exhaust gas outputted during the engine operation at the time of performing the power generation of the power generator 16. The non-power generating time noxious component output quantity (g/s) is a quantity of the noxious component in the exhaust gas outputted during the engine operation at the time of stopping the power generation of the power generator 16.

When the power generation quantity of the power generator 16 is changed in an operational region around a boundary of FIG. 2 where the combustion mode is changed, the engine torque could be changed by an amount that is equal to a change in a drive torque of the power generator 16 (hereinafter, referred to as a power generation torque), and thereby the combustion mode could be changed. Thus, at the time of driving the vehicle at the region around the boundary where the combustion mode is changed, the combustion mode may possibly be frequently changed by a change in the power generation torque. The change of the combustion mode is accompanied with the change of the engine torque. Thus, when the combustion mode is frequently changed due to the change of the power generation torque during the driving of the vehicle, the driver of the vehicle may frequently feel the torque change, thereby deteriorating the drive feeling of the driver.

In order to address this problem, the control unit 11 limits the power generation quantity (thereby the power generation torque) of the power generator 16 by setting upper and lower limit guard values such that the current combustion mode is maintained during the power generation of the power generator 16 by the upper and lower limit guard values. Furthermore, the control unit 11 computes the remaining electric charge SOC of the battery 12. When the remaining electric charge SOC of the battery 12 drops to or below a predetermined value, the above combustion mode maintaining operation is cancelled, and the priority is given to the power generation of the power generator 16 to recover the remaining electric charge SOC of the battery 12. Furthermore, when the electric power consumption in the vehicle is equal to or greater than a predetermined value, the above combustion mode maintaining operation is cancelled, and the power generation quantity of the power generator 16 is controlled in a manner that does not cause overdischarge of the battery 12.

Figure 4:
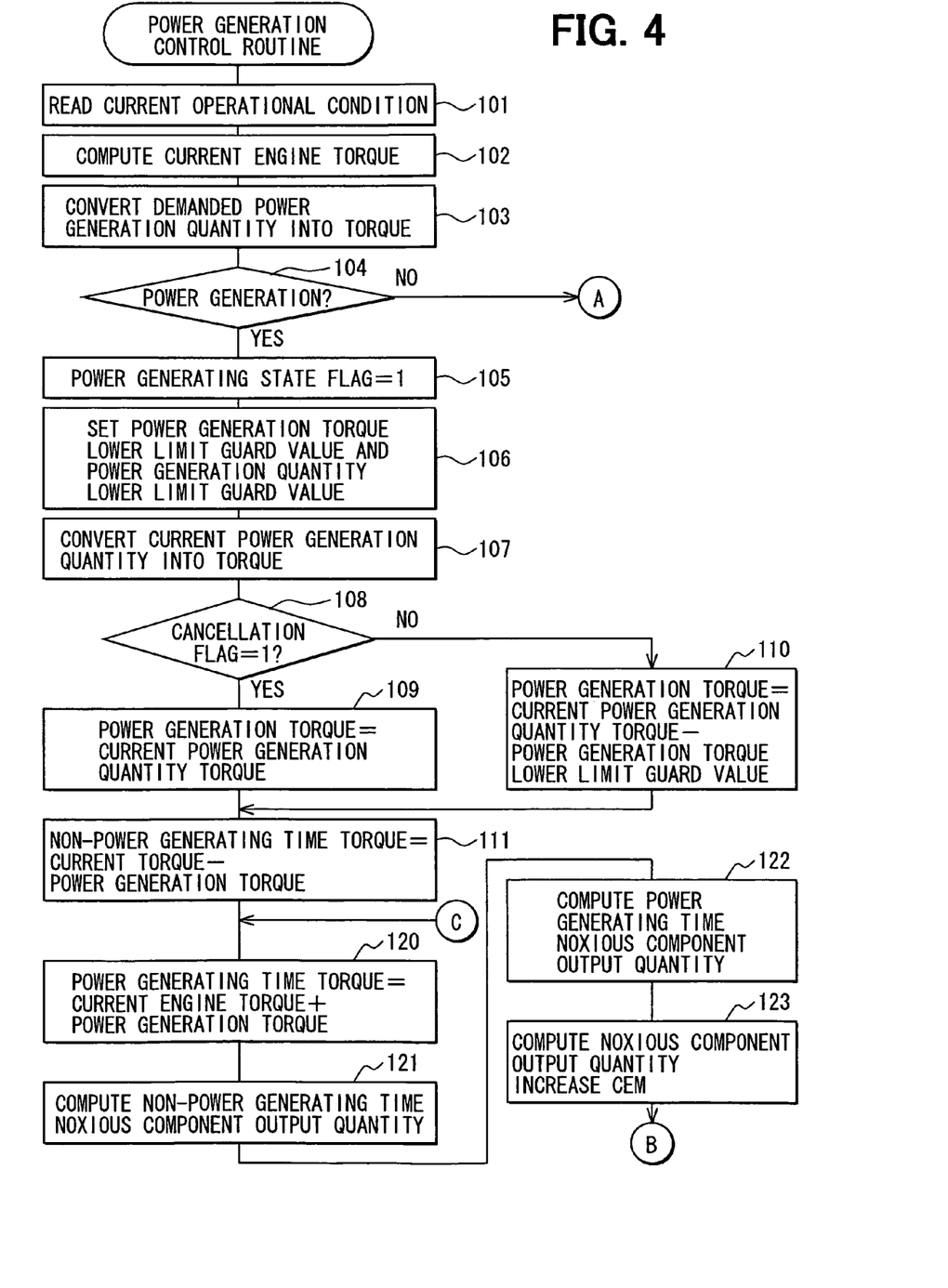
FIG. 4 is a diagram showing a first part of a flowchart, which indicates a power generation control routine according to the first embodiment.
Figure 5:
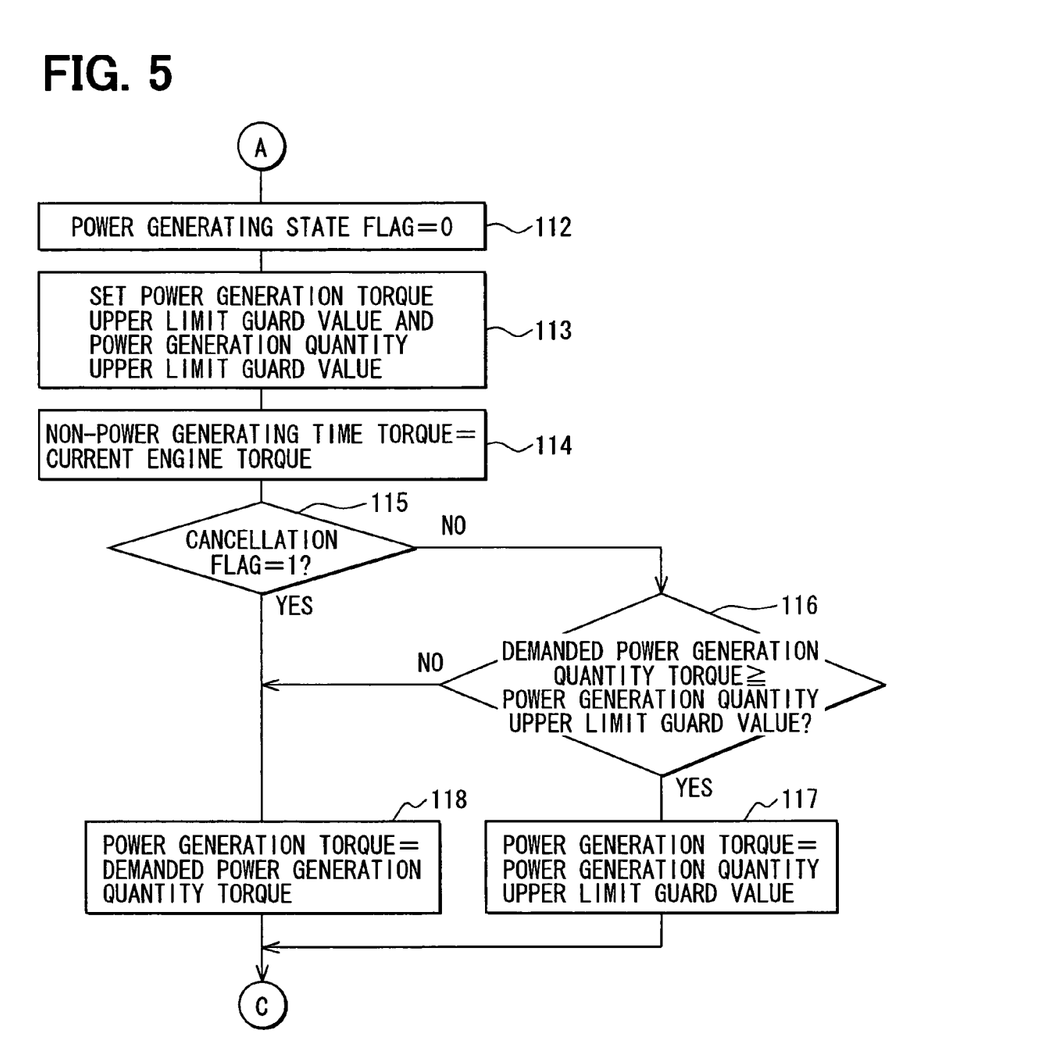
FIG. 5 is a diagram showing a second part of the flowchart, which indicates the power generation control routine according to the first embodiment.
Figure 6:
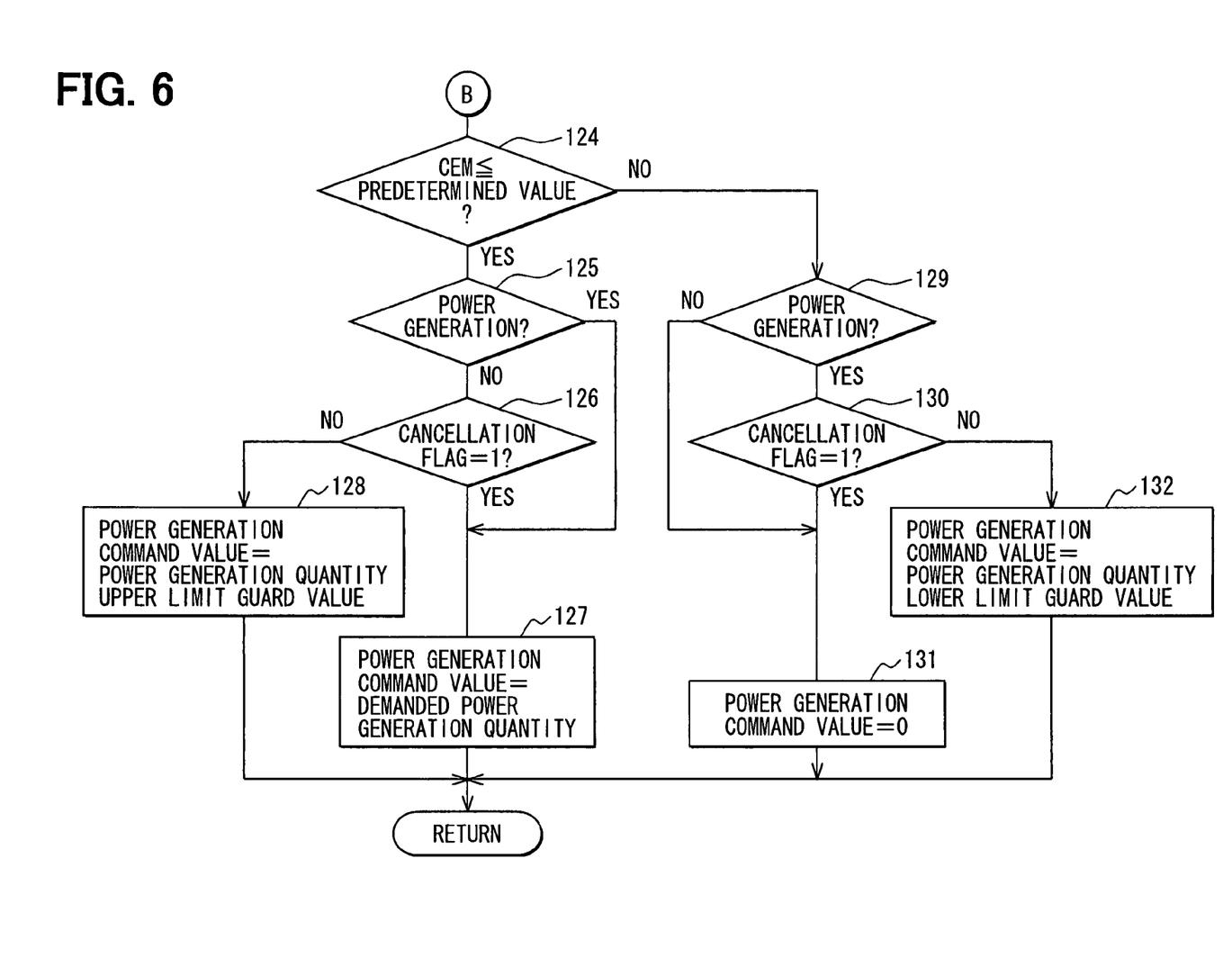
FIG. 6 is a diagram showing a third part of the flowchart, which indicates the power generation control routine according to the first embodiment.
Figure 7:
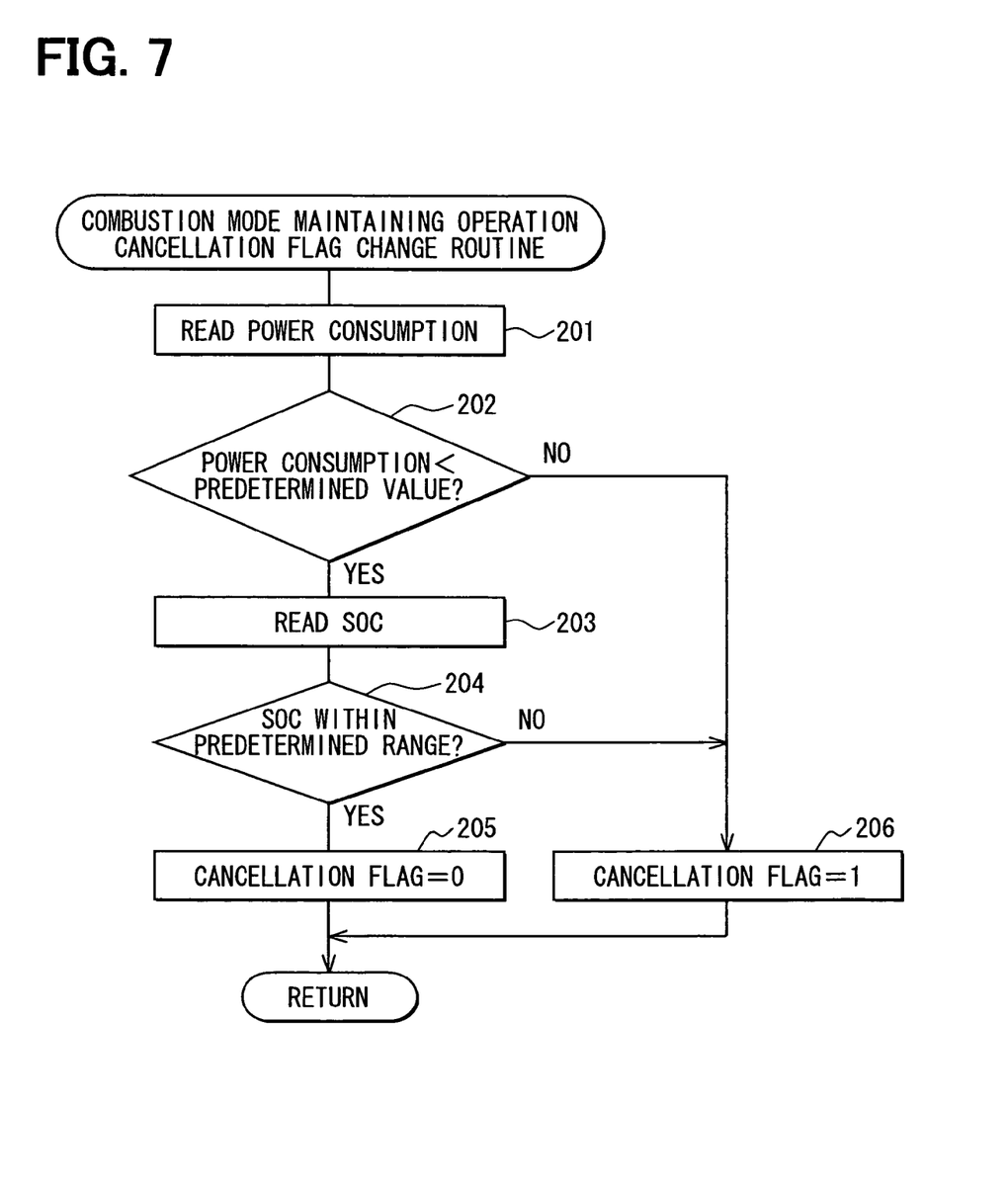
FIG. 7 is a flowchart showing a combustion mode maintaining operation cancellation flag change routine.

The above described power generation control of the first embodiment is performed by the control unit 11 trough execution of a power generation control routine shown in FIGS. 4 to 6 and a combustion mode maintaining operation cancellation flag change routine shown in FIG. 7. Hereinafter, each of these routines will be described.

The power generation control routine shown in FIGS. 4 to 6 is executed at predetermined intervals (e.g., 8 ms intervals) during the engine operation and serves as a power generation control means of the present invention. When the power generation control routine starts, a current operational condition (e.g., an engine rotational speed, an intake air quantity, and/or a demanded power generation quantity) is read at steps 101. Here, the demanded power generation quantity is computed based on a deviation between the current battery remaining electric charge SOC and a target remaining electric charge of the battery.

Then, control proceeds to step 102. At step 102, the current engine torque is computed based on the current operational condition. Thereafter, control proceeds to step 103. At step 103, the demanded power generation quantity is converted into a corresponding torque (i.e., a torque that is required to generate the demanded power generation quantity), and then the computed torque is stored as a demanded power generation quantity torque in a RAM of the control unit 11.

Then, at step 104, it is determined whether the power generator 16 is in a power generating state, in which the power generator 16 is currently generating the power. When it is determined that the power generator 16 is in the power generating state, control proceeds to step 105 where a power generating state flag is set to "1". Then, control proceeds to step 106 where a power generation torque lower limit guard value and a power generation quantity lower limit guard value, which are required to maintain the current combustion mode, are set. At this time, when the current combustion mode is the stratified combustion mode, the combustion mode will not change even when the power generation is stopped, i.e., even when the power generation torque becomes zero. Thus, in such a case, the power generation torque lower limit guard value and the power generation quantity lower limit guard value are both set to zero.

Then, control proceeds to step 107 where the current power generation quantity is converted into the corresponding torque, and this torque is stored as the current power generation quantity torque in the RAM of the control unit 11. Then, control proceeds to step 108 where it is determined whether the combustion mode maintaining operation cancellation flag is set to "1". When it is determined that the combustion mode maintaining operation cancellation flag is set to "1" at step 108, it is then determined that the combustion mode maintaining operation is cancelled, and thereby control proceeds to step 109. At step 109, the current power generation quantity torque, which is computed at step 107, is directly set as the "power generation torque".

In contrast, when the combustion mode maintaining operation cancellation flag is set to "0", it is determined that the combustion maintaining operation is currently executed, and thereby control proceeds to step 110. At step 110, a value, which is obtained by subtracting the power generation torque lower limit guard value from the current power generation quantity torque computed at step 107, as the "power generation torque". In this way, the current combustion mode is maintained.

As described above, after the computation of the "power generation torque" at steps 109 or 110, control proceeds to step 111. At step 111, a non-power generating time torque is computed by subtracting the "power generation torque" from the current engine torque computed at step 102. The non-power generating time torque corresponds to an engine torque in a case where the power generation of the power generator 16 is stopped.

In contrast, when it is determined that the power generator 16 is not in the power generating state at step 104, control proceeds to step 112 of FIG. 5. At step 112, the power generating state flag is set to "0", which indicates that the power generation by the power generator 16 is stopped. Then, at step 113, a power generation torque upper limit guard value and a power generation quantity upper limit guard value, which are required to maintain the current combustion mode, are set. Thereafter, control proceeds to step 114 where the current engine torque is directly used as the non-power generating time torque.

Then, control proceeds to step 115 where it is determined whether the combustion mode maintaining operation cancellation flag is set to "1". When it is determined that the combustion mode maintaining operation cancellation flag is set to "1" at step 115, it is then determined that the combustion mode maintaining operation is cancelled, and thereby control proceeds to step 118. At step 118, the demanded power generation quantity torque, which is computed at step 103, is directly set as the "power generation torque".

In contrast, when the combustion mode maintaining operation cancellation flag is set to "0", it is determined that the combustion mode maintaining operation is currently executed, and control proceeds to step 116. At step 116, it is determined whether the demanded power generation quantity torque, which is computed at step 103, is equal to or greater than the power generation torque upper limit guard value. When it is determined that the demanded power generation quantity torque is equal to or greater than the power generation torque upper limit guard value, control proceeds to step 117. At step 117, in order to maintain the current combustion mode, the power generation torque upper limit guard value is set as the power generation torque, i.e., the "power generation torque" is guarded by the power generation torque upper limit guard value. At step 116, when it is determined that the demanded power generation quantity torque is smaller than the power generation torque upper limit guard value, it is determined that that the combustion mode will not be changed even when the power generation of the power generator 16 is performed at the level that satisfies the demanded power generation quantity. Thereby, control proceeds to step 118. At step 118, the demanded power generation quantity torque is directly set as the "power generation torque".

Thereafter, control proceeds to step 120. At step 120, the "power generation torque", which is computed at one of steps 109, 110, 117 and 118, is added to the current engine torque, which is computed at step 102, so that "a power generating time torque" is obtained. The power generating time torque corresponds to an engine torque in a case where the power generation of the power generator 16 is performed.

Thereafter, control proceeds to step 121. At step 121, a non-power generating time noxious component output quantity (g/s), which corresponds to the current engine rotational speed and the non-power generating time torque, is computed based on a noxious component output quantity computation map, which is similar to one shown in FIG. 3. The non-power generating time noxious component output quantity corresponds to the noxious component output quantity in the exhaust gas in the case where the power generator 16 is stopped. The noxious component output quantity computation map is preset by measuring the noxious component output quantity in a constant operational condition.

Thereafter, control proceeds to step 122. At step 122, a power generating time noxious component output quantity (g/s), which corresponds to the current engine rotational speed and the non-power generating time torque, is computed based on the noxious component output quantity computation map, which is similar to the one shown in FIG. 3. The non-power generating time noxious component output quantity corresponds to the noxious component output quantity in the exhaust gas in the case where the power generator 16 is operated to perform the power generation.

Thereafter, control proceeds to step 123. At step 123, a difference between the power generating time noxious component output quantity (g/s) and the non-power generating time noxious component output quantity (g/s) is divided by the current power generation quantity (kW), so that the noxious component output quantity increase CEM (g/skW) per unit power generation quantity is obtained.

$$CEM(g/skW)=\text{(power generating time noxious component output quantity–non-power generating time noxious component output quantity)/power generation quantity}$$

The above described steps 121-123 serve as an exhaust gas predicting means of the present invention.

Thereafter, control proceeds to step 124 of FIG. 6. At step 124, the noxious component output quantity increase CEM per unit power generation quantity is compared with a predetermined value. When the noxious component output quantity increase CEM per unit power generation quantity is equal to or less than the predetermined value, it is determined that the current operation is in a range (a range suitable to the power generation), in which the noxious component output quantity increase CEM per unit power generation quantity is small, and control proceeds to step 125. At step 125, it is determined whether the power generation is currently performed by the power generator 16. When it is determined that the power generation is currently performed by the power generator 16 at step 125, control proceeds to step 127. At step 127, the demanded power generation quantity is set as a power generation command value. In this way, the control electric current, which corresponds to the power generation command value, is applied to a field coil of the power generator 16, so that the power generation, which corresponds to the demanded power generation quantity, is performed by the power generator 16.

Then, when it is determined that the power generation is not currently performed by the power generator 16 at step 125, control proceeds to step 126. At step 126, it is determined whether the combustion mode maintaining operation cancellation flag is set to "1". When it is determined that the combustion mode maintaining operation cancellation flag is set to "1" at step 126, it is determined that the combustion mode maintaining operation is cancelled. Then, control proceeds to step 127. At step 127, the demanded power generation quantity is set as the power generation command value. In this way, the power generation is performed to provide the demanded power generation quantity, so that occurrence of the charge shortage of the battery 12 can be avoided in advance.

In contrast, when the combustion mode maintaining operation cancellation flag is set to "0", it is determined that the combustion mode maintaining operation is currently executed, and control proceeds to step 128. At step 128, the power generation quantity upper limit guard value is set as the power generation command value, i.e., the power generation command value is guarded by the power generation quantity upper limit guard value. In this way, the current combustion mode is maintained, and at the same time the electric power, which corresponds to the power generation quantity upper limit guard value, is generated.

In contrast, when it is determined that the noxious component output quantity increase CEM per unit power generation quantity is equal to or greater than the predetermined value at step 124, control proceeds to step 129. At step 129, it is determined whether the power generation is currently performed by the power generator 16. When it is determined that the power generation is currently performed by the power generator 16 at step 129, control proceeds to step 130. At step 130, it is determined whether the combustion mode maintaining operation cancellation flag is set to "1". When it is determined that the combustion mode maintaining operation cancellation flag is set to "1" at step 130, it is determined that the combustion mode maintaining operation is cancelled, and control proceeds to step 131. At step 131, the power generation command value is set to zero, and the power generation is stopped. In this way, the noxious component output increase can be limited. When it is determined that the power generation is not currently performed by the power generator 16 at step 129, control proceeds to step 131. At step 131, the power generation command value is set to zero, and thereby the power generation is kept stopped.

In contrast, when the combustion mode maintaining operation cancellation flag is set to "0", it is determined that the combustion mode maintaining operation is currently executed, and control proceeds to step 132. At step 132, the power generation quantity lower limit guard value is set as the power generation command value, i.e., the power generation command value is guarded by the power generation quantity lower limit guard value. In this way, the current combustion mode is maintained, and at the same time the electric power, which corresponds to the power generation quantity lower limit guard value, is generated.

A combustion mode maintaining operation cancellation flag change routine shown in FIG. 7 is executed at predetermined intervals (e.g., 8 ms intervals) during the engine operation and serves as a power generation control means of the present invention. When this routine starts, at step 201, the current electric power consumption of the vehicle, which is computed by an electric power consumption computing routine (an electric power consumption determining means), is read. Then, at step 202, it is determined whether the current electric power consumption is below a predetermined value. When it is determined that the current electric power consumption is equal to or greater than the predetermined value, control proceeds to step 206. At step 206, the combustion mode maintaining operation cancellation flag is set to "1". In this way, when the electric power consumption becomes equal to or greater than the predetermined value, the combustion mode maintaining operation is cancelled.

In contrast, when it is determined that the current electric power consumption is below the predetermined value, control proceeds to step 203. At step 203, the current SOC (the remaining electric charge) of the battery, which is computed by a battery SOC computing routine (a remaining electric charge determining means), is read. Then, at step 204, it is determined whether the current SOC is within a predetermined range, in which a difference between the current SOC and the target SOC is equal to or less than a predetermined value. Then, when it is determined that the current SOC is within the predetermined range at step 204, it is determined that the current SOC is still sufficient, and control proceeds to step 205. At step 205, the combustion mode maintaining operation cancellation flag is set to "0", which indicates the continuation of the combustion mode. In contrast, when it is determined that the current SOC is out of the predetermined range at step 204, control proceeds to step 206. At step 206, the combustion mode maintaining operation cancellation flag is set to "1". In this way, when the current SOC is out of the predetermined range, the combustion mode maintaining operation is cancelled.

In the first embodiment, the power generation quantity (and the power generation torque) of the power generator 16 is limited by the upper and lower guard values to maintain the current combustion mode during the power generation of the power generator 16. Thus, it is possible to limit occurrence of frequent change of the combustion mode caused by the change of the power generation torque at the time of driving the vehicle, and thereby it is possible to limit deterioration of the drive feeling caused by the frequent change of the combustion mode.

Furthermore, in the first embodiment, the noxious component output quantity increase CEM per unit power generation quantity is obtained by dividing the difference between the power generating time noxious component output quantity and the non-power generating time noxious component output quantity by the current power generation quantity. Then, the power generation of the power generator 16 is performed by selecting the operational condition, which makes the noxious component output quantity increase CEM per unit power generation quantity equal to or less than the predetermined value while maintaining the current combustion mode. Thus, the noxious component output increase caused by the power generation can be reduced while maintaining the current combustion mode. As a result, the maintaining of the current combustion mode and the reducing of the emissions can be balanced.

Furthermore, in the first embodiment, the combustion mode maintaining operation is cancelled in the range, in which the shortage of the remaining electric charge SOC of the battery 12 may occur, based on the remaining electric charge SOC of the battery and the electric power consumption of the vehicle. Therefore, the power generation of the power generator 16 is performed by giving the first priority to the power generation, so that the remaining charge SOC of the battery 12 is maintained or recovered. As a result, it is possible to limit the occurrence of the shortage of the remaining electric charge of the battery 12 in advance.

Second Embodiment

In the first embodiment, the power generation of the power generator 16 is performed by selecting the operational condition, which makes the noxious component output quantity increase CEM per unit power generation quantity equal to or less than the predetermined value. Alternatively, the power generation of the power generator 16 may be performed by selecting an operational condition, which makes a fuel consumption quantity increase CFC per unit power generation quantity equal to or less than a predetermined value. This point will be described with reference to FIGS. 8 to 10.

Figure 8:
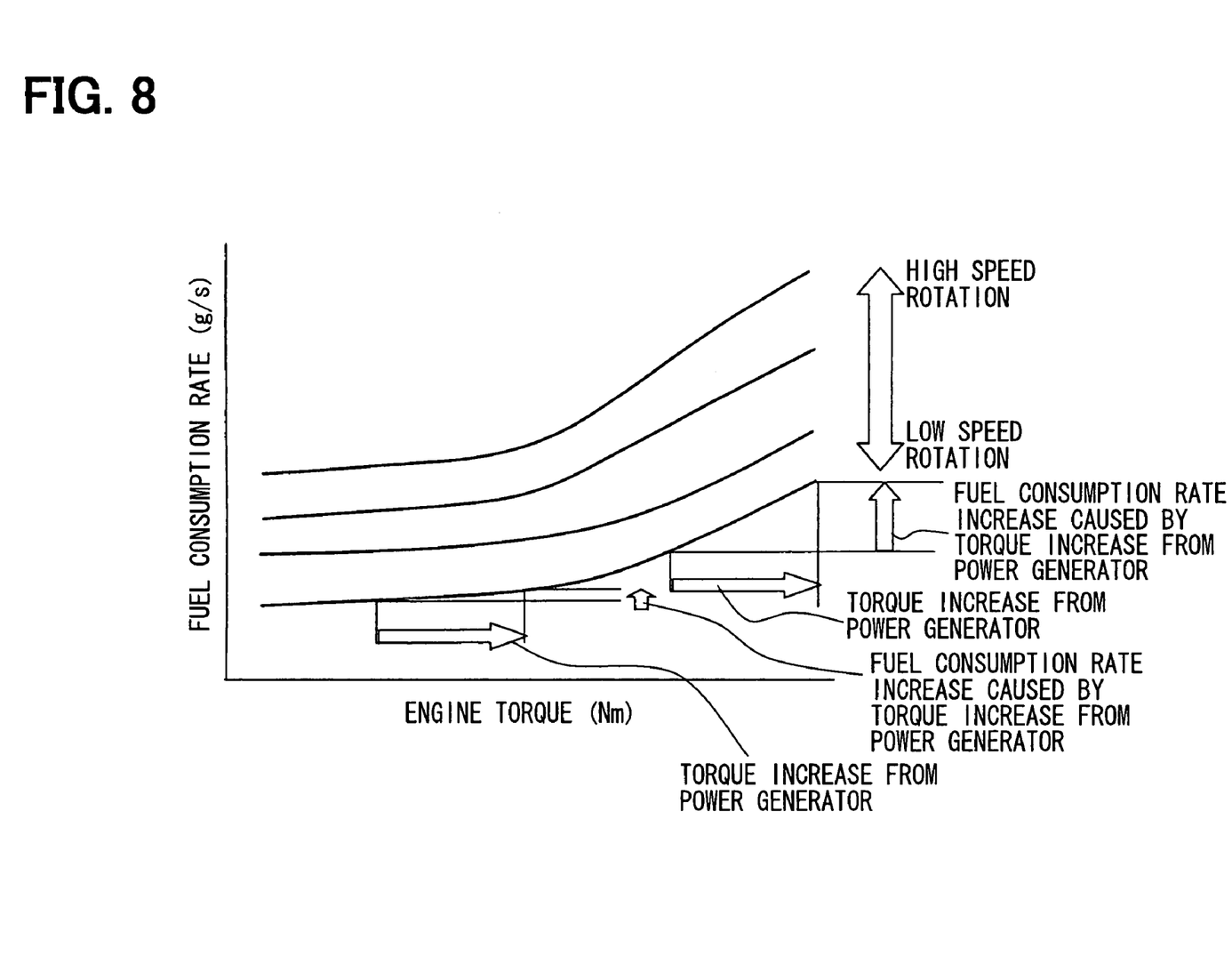
FIG. 8 is a diagram showing a relationship between a fuel consumption rate and an engine operational condition according to a second embodiment of the present invention.

FIG. 8 is a diagram showing a relationship between the engine operational condition and a fuel consumption rate, which is a fuel consumption quantity per unit time. As shown in FIG. 8, the fuel consumption rate changes according to the engine rotational speed and the engine torque. The fuel consumption rate changes curvilinearly according to the engine torque. Thus, in a case of a constant engine rotational speed, a fuel consumption rate large increase condition and a fuel consumption rate small increase condition exist. In the fuel consumption rate large increase condition, an increase in the fuel consumption rate with respect to an increase in the engine torque is relatively large. In contrast, in the fuel consumption rate small increase condition, an increase in the fuel consumption rate with respect to the increase in the engine torque is relatively small. For example, in a case where the power generator 16 generates a constant power, a torque of the power generator 16 is added to the engine torque, so that an engine operating point changes. Thus, the fuel consumption rate changes according to the power generation quantity of the power generator 16. At this time, only the fuel consumption rate small increase condition, under which the fuel consumption rate is relatively small, is selected, and the power generation is performed under such a condition. In this way, the fuel consumption rate can be reduced.

Thus, in the second embodiment, a fuel consumption rate increase per unit power generation quantity is used as the parameter for controlling the power generation. The fuel consumption rate increase per unit power generation quantity is computed as follows. First, a fuel consumption rate (a power generating time fuel consumption rate) during the engine operation (during the driving of the vehicle) at the time of performing the power generation of the power generator 16 is obtained. Also, a fuel consumption rate (a non-power generating time fuel consumption rate) during the engine operation (during the driving of the vehicle) at the time of stopping the power generation of the power generator 16 is obtained. Then, a fuel consumption rate increase caused by the power generation is obtained based on a difference between the power generating time fuel consumption rate and the non-power generating time fuel consumption rate. Thereafter, the fuel consumption rate increase caused by the power generation is divided by the power generation quantity of the power generator 16, so that the fuel consumption rate increase per unit power generation quantity is obtained.

> Fuel consumption rate increase per unit power generation quantity ($g/skW$)=(power generating time fuel consumption rate−non-power generating time fuel consumption rate)/power generation quantity Even in the second embodiment, similar to the first embodiment, the power generation quantity (and the power generation torque) of the power generator 16 is limited by the upper and lower limit guard values to maintain the current combustion mode during the power generation of the power generator 16. In this case, when the remaining electric charge SOC of the battery 12 drops to or below the predetermined value, the above combustion mode maintaining operation is cancelled, and the priority is given to the power generation of the power generator 16 to recover the remaining electric charge SOC of the battery 12. Furthermore, when the electric power consumption of the vehicle is equal to or greater than a predetermined value, the above combustion mode maintaining operation is cancelled, and the power generation quantity of the power generator 16 is controlled in a manner that does not cause overdischarge of the battery 12.

Figure 9:
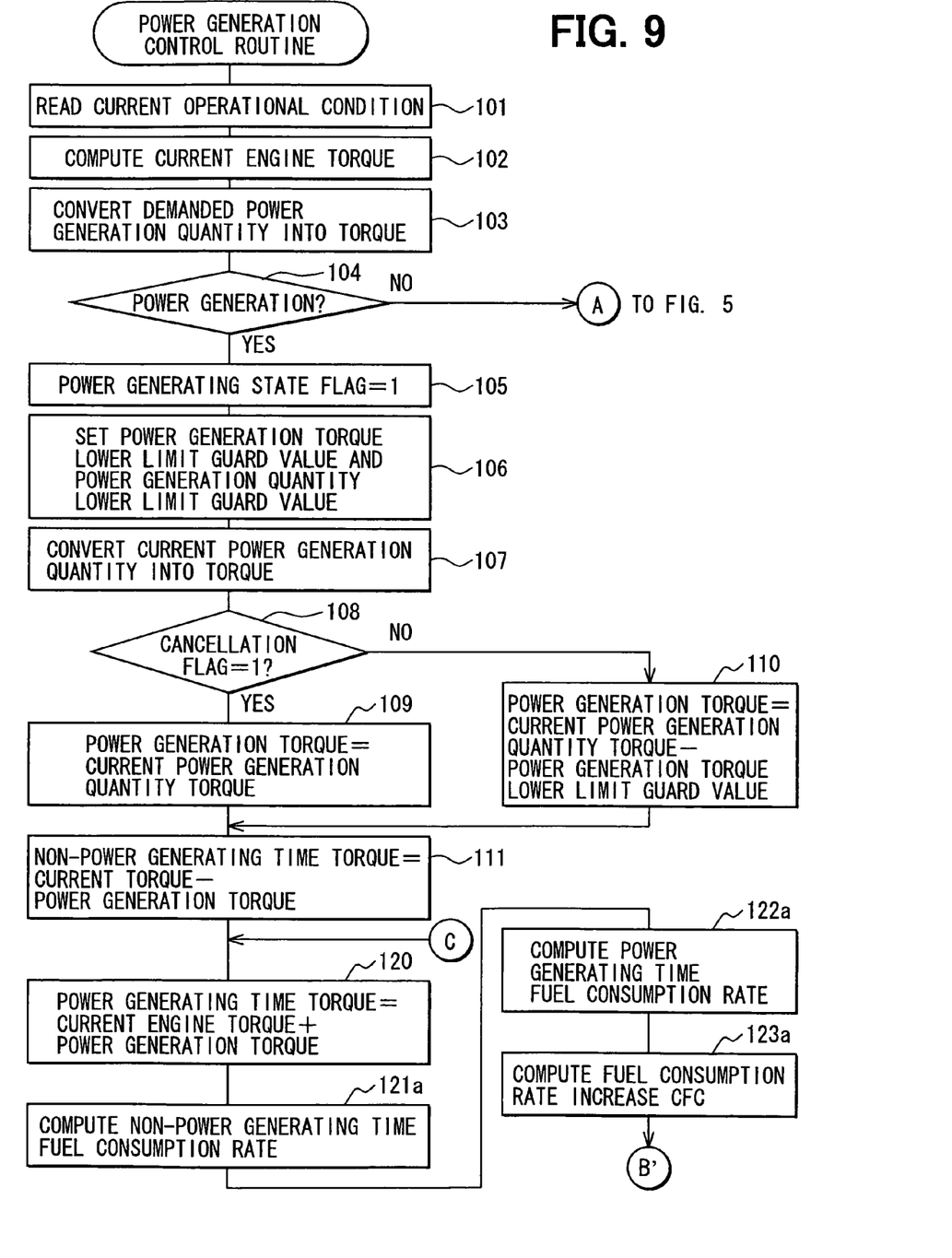
FIG. 9 is a diagram showing a first part of a flowchart, which indicates a power generation control routine according to the second embodiment.
Figure 10:
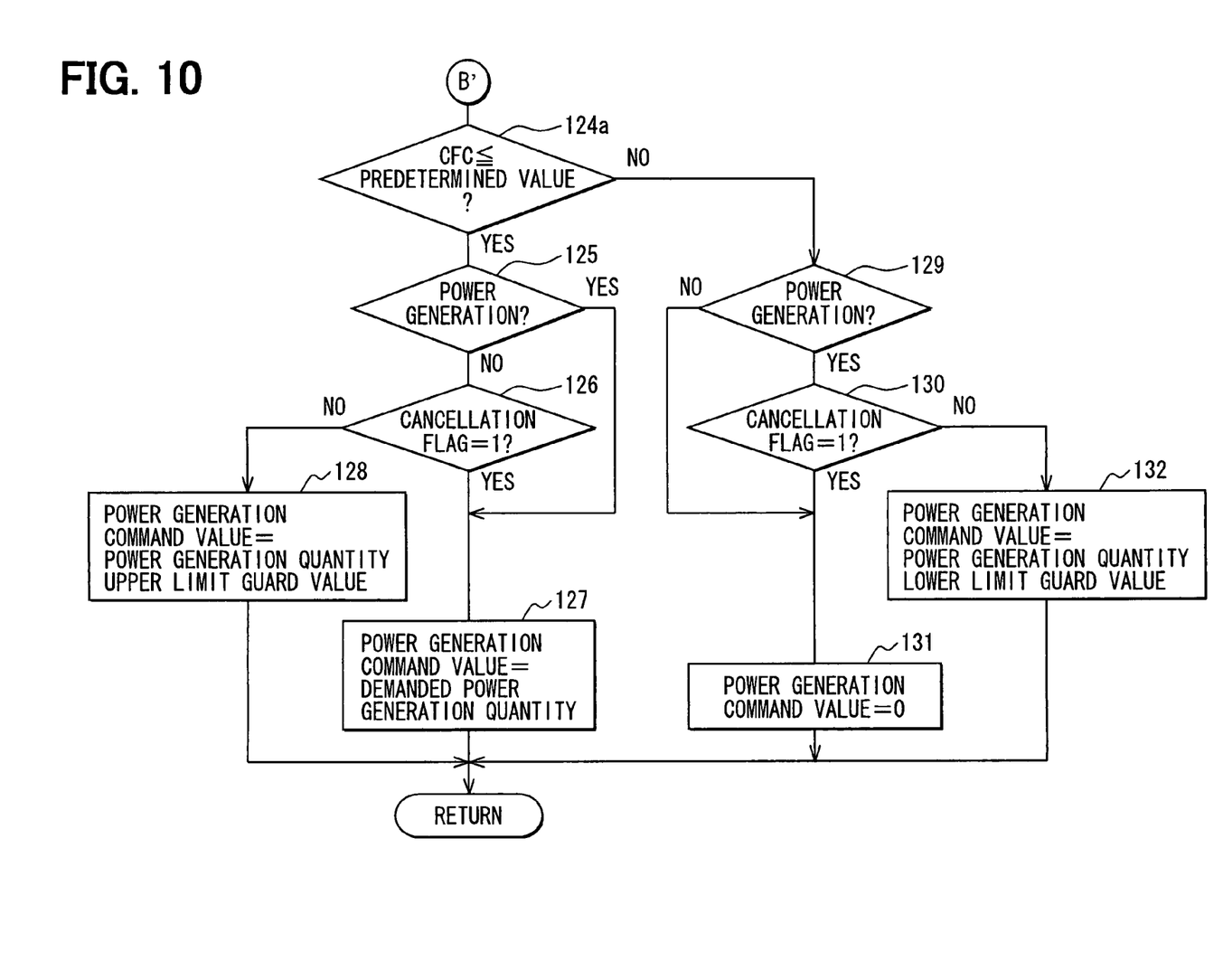
FIG. 10 is a diagram showing a second part of the flowchart, which indicates the power generation control routine according to the second embodiment.

The power generation control of the second embodiment is executed by the control unit 11 through execution of a power generation control routine of FIGS. 9, 10 and 5. In the second embodiment, the combustion mode maintaining operation cancellation flag change routine of FIG. 7 is also executed.

Steps 121a-124a of the power generation control routine of FIGS. 9 and 10 differ from the corresponding steps of the first embodiment, and other than these steps, the power generation control routine of FIGS. 9 and 10 is the same as that of the first embodiment.

When this routine starts, the non-power generating time torque and the power generating time torque are computed through steps 101-120 in the manner similar to that of the first embodiment. Thereafter, control proceeds to step 121a. At step 121a, the non-power generating time fuel consumption rate (g/s), which corresponds to the current engine rotational speed and the non-power generating time torque, is computed based on a fuel consumption computation map, which is similar to one shown in FIG. 8. The non-power generating time fuel consumption rate corresponds to the fuel consumption rate in the case where the power generation of the power generator 16 is stopped. The fuel consumption rate computation map is preset by measuring the fuel consumption rate in a constant operational condition.

Thereafter, control proceeds to step 122a. At step 122a, the power generating time fuel consumption rate (g/s), which corresponds to the current engine rotational speed and the power generating time torque, is computed based on the fuel consumption rate computation map, which is similar to the one shown in FIG. 8. The power generating time fuel consumption rate corresponds to the fuel consumption rate in the case where the power generation of the power generator 16 is performed.

Thereafter, control proceeds to step 123a. At step 123a, a difference between the power generating time fuel consumption rate (g/s) and the non-power generating time fuel consumption rate (g/s) is divided by the current power generation quantity (kW), so that the fuel consumption rate increase CFC (g/skW) per unit power generation quantity is obtained.

$CFC(g/skW)$=(power generating time fuel consumption rate−non-power generating time fuel consumption rate)/power generation quantity The above described steps 121a-123a serve as a fuel consumption quantity predicting means of the present invention.

Thereafter, control proceeds to step 124a of FIG. 10. At step 124a, the fuel consumption rate increase CFC per unit power generation quantity is compared with a predetermined value. When the fuel consumption rate increase CFC per unit power generation quantity is less than the predetermined value, it is determined that the current operation is in a range (a range suitable to the power generation), in which the fuel consumption rate increase CFC per unit power generation quantity is small, and control proceeds to step 125. At step 125, it is determined whether the power generation is currently performed by the power generator 16. When it is determined that the power generation is currently performed by the power generator 16 at step 125, control proceeds to step 127.

At step 127, the demanded power generation quantity is set as a power generation command value. Furthermore, in the case where the power generation is stopped (i.e., NO at step 125), when the combustion mode maintaining operation cancellation flag is "1" (i.e., YES at step 126), the demanded power generation quantity is also set as the power generation command value at step 127. In contrast, when the combustion mode maintaining operation cancellation flag is "0" (i.e., NO at step 126), the power generation quantity upper limit guard value is set as the power generation command value at step 128, and the power generation is performed within a range, in which the current combustion mode can be maintained (steps 120-128).

In contrast, when it is determined that the fuel consumption rate increase CFC per unit power generation quantity is greater than the predetermined value at step 124a, control proceeds to step 129. At step 129, it is determined whether the power generation is currently performed by the power generator 16. When it is determined that the power generation is not currently performed by the power generator 16 at step 129, the power generation command value is set to zero at step 131. Furthermore, in the case where the power generation is currently performed (i.e., YES at step 129), when the combustion mode maintaining operation cancellation flag is "1" (i.e., YES at step 130), the demanded power generation quantity is also set to zero at step 131. Thus, the power generation by the power generator 16 is stopped to limit the deterioration of the fuel consumption. In contrast, when the combustion mode maintaining operation cancellation flag is "0" (i.e., NO at step 130), the power generation quantity lower limit guard value is set as the power generation command value at step 132, and the power generation is performed within a range, in which the current combustion mode can be maintained (steps 130-132).

Even in the second embodiment, the power generation quantity (and the power generation torque) of the power generator 16 is limited by the upper and lower guard values to maintain the current combustion mode during the power generation of the power generator 16. Thus, it is possible to limit occurrence of frequent change of the combustion mode caused by the change of the power generation torque at the time of driving the vehicle, and thereby it is possible to limit deterioration of the drive feeling caused by the frequent change of the combustion mode.

Furthermore, in the second embodiment, the fuel consumption rate increase CFC per unit power generation quantity is computed. The power generation of the power generator 16 is performed by selecting the operational condition, which makes the fuel consumption rate increase CFC per unit power generation quantity equal to or less than the predetermined value while the current combustion mode is maintained. Thus, the fuel consumption rate increase CFC per unit power generation quantity can be reduced while maintaining the current combustion mode. Therefore, the maintaining of the combustion mode and the reducing of the fuel consumption can be balanced.

Here, it should be noted that the present invention is not limited to the direct injection engine and is also applicable to any suitable engine, which can change its combustion mode, such as a lean-burn engine, which can change its combustion mode between a stoichiometric combustion mode and a lean combustion mode based on the operational condition. In the stoichiometric combustion mode, the air/fuel mixture gas, which is around a theoretical air/fuel ratio, is combusted. In the lean combustion mode, the lean air/fuel mixture is combusted.

Additional advantages and modifications will readily occur to those skilled in the art. The invention in its broader terms is therefore not limited to the specific details, representative apparatus, and illustrative examples shown and described.

What is claimed is:

1. A power generation control system for an internal combustion engine of a vehicle, which changes a combustion mode based on an operational condition, the power generation control system comprising:
    a power generator that is driven by a drive force of the internal combustion engine to generate electric power;
    a battery that stores the electric power, which is generated by the power generator; and
    a power generation control means for controlling a power generation quantity of the power generator, wherein the power generation control means controls the power generation quantity of the power generator in a manner that maintains a current combustion mode of the internal combustion engine.

2. The power generation control system according to claim 1, further comprising an exhaust gas predicting means for predicting a noxious component output quantity increase in exhaust gas of the internal combustion engine caused by power generation of the power generator, wherein:
    the exhaust gas predicting means predicts:
        a noxious component output quantity in the exhaust gas of the internal combustion engine in a generator operating state where the power generation of the power generator is performed during operation of the internal combustion engine; and
        a noxious component output quantity in the exhaust gas of the internal combustion engine in a generator non-operating state where the power generation of the power generator is stopped during the operation of the internal combustion engine;
    the exhaust gas predicting means predicts the noxious component output quantity increase based on a difference between the noxious component output quantity in the generator operating state and the noxious component output quantity in the generator non-operating state; and
    the power generation control means controls the power generation quantity of the power generator in view of the noxious component output quantity increase in the manner that maintains the current combustion mode of the internal combustion engine.

3. The power generation control system according to claim 1, further comprising a fuel consumption quantity predicting means for predicting a fuel consumption quantity increase of the internal combustion engine caused by power generation of the power generator, wherein:
    the fuel consumption quantity predicting means predicts:
        a fuel consumption quantity of the internal combustion engine in a generator operating state where the power generation of the power generator is performed during operation of the internal combustion engine; and
        a fuel consumption quantity of the internal combustion engine in a generator non-operating state where the power generation of the power generator is stopped during the operation of the internal combustion engine;
    the fuel consumption quantity predicting means predicts the fuel consumption quantity increase based on a difference between the fuel consumption quantity in the generator operating state and the fuel consumption quantity in the generator non-operating state; and
    the power generation control means controls the power generation quantity of the power generator in view of the fuel consumption increase in the manner that maintains the current combustion mode of the internal combustion engine.

4. The power generation control system according to claim 1, further comprising a remaining electric charge determining means for determining a remaining electric charge of the battery, wherein:
    the power generation control means determines whether priority should be given to charging of the battery over maintaining of the current combustion mode based on the remaining electric charge of the battery determined by the remaining electric charge determining means; and
    when the power generation control means determines that the priority should be given to the charging of the battery over the maintaining of the current combustion mode, the power generation control means controls the power generation quantity of the power generator without requiring the maintaining of the current combustion mode of the internal combustion engine.

5. The power generation control system according to claim 1, further comprising a power consumption determining means for determining an electric power consumption in the vehicle, wherein:
    the power generation control means determines whether priority should be given to generating of the electric power by the power generator over maintaining of the current combustion mode based on the electric power consumption determined by the power consumption determining means; and
    when the power generation control means determines that the priority should be given to the generating of the electric power by the power generator over the maintaining of the current combustion mode, the power generation control means controls the power generation quantity of the power generator without requiring the maintaining of the current combustion mode of the internal combustion engine.

6. The power generation control system according to claim 1, wherein the power generation control means controls the power generation quantity of the power generator in the manner that maintains the current combustion mode of the internal combustion engine at time of driving the vehicle.

7. The power generation control system according to claim 1, wherein the combustion mode is changed between a stratified combustion mode and a homogeneous combustion mode or between a stoichiometric combustion mode and a lean combustion mode based on the operational condition.

8. A power generation control system for an internal combustion engine of a vehicle, which changes a combustion mode based on an operational condition, the power generation control system comprising:
    a power generator that is driven by a drive force of the internal combustion engine to generate electric power;
    a battery that stores the electric power, which is generated by the power generator; and
    a controller that controls a power generation quantity of the power generator, wherein the controller controls the power generation quantity of the power generator in a manner that maintains a current combustion mode of the internal combustion engine.

9. The power generation control system according to claim 8, wherein:
    the controller predicts a noxious component output quantity in exhaust gas of the internal combustion engine in a generator operating state where power generation of the power generator is performed during operation of the internal combustion engine;

the controller predicts a noxious component output quantity in the exhaust gas of the internal combustion engine in a generator non-operating state where the power generation of the power generator is stopped during the operation of the internal combustion engine;

the controller predicts a noxious component output quantity increase in exhaust gas of the internal combustion engine caused by the power generation of the power generator based on a difference between the noxious component output quantity in the generator operating state and the noxious component output quantity in the generator non-operating state; and the controller controls the power generation quantity of the power generator in view of the noxious component output quantity increase in the manner that maintains the current combustion mode of the internal combustion engine.

10. The power generation control system according to claim 8, wherein:

the controller predicts a fuel consumption quantity of the internal combustion engine in a generator operating state where power generation of the power generator is performed during operation of the internal combustion engine;

the controller predicts a fuel consumption quantity of the internal combustion engine in a generator non-operating state where the power generation of the power generator is stopped during the operation of the internal combustion engine;

the controller predicts a fuel consumption quantity increase of the internal combustion engine caused by the power generation of the power generator based on a difference between the fuel consumption quantity in the generator operating state and the fuel consumption quantity in the generator non-operating state; and the controller controls the power generation quantity of the power generator in view of the fuel consumption increase in the manner that maintains the current combustion mode of the internal combustion engine.

11. The power generation control system according to claim 8, wherein:

the controller determines whether priority should be given to charging of the battery over maintaining of the current combustion mode based on a remaining electric charge of the battery; and when the controller determines that the priority should be given to the charging of the battery over the maintaining of the current combustion mode, the controller controls the power generation quantity of the power generator without requiring the maintaining of the current combustion mode of the internal combustion engine.

12. The power generation control system according to claim 8, wherein:

the controller determines whether priority should be given to generating of the electric power by the power generator over maintaining of the current combustion mode based on an electric power consumption in the vehicle; and when the controller determines that the priority should be given to the generating of the electric power by the power generator over the maintaining of the current combustion mode, the controller controls the power generation quantity of the power generator without requiring the maintaining of the current combustion mode of the internal combustion engine.

13. The power generation control system according to claim 8, wherein the controller controls the power generation quantity of the power generator in the manner that maintains the current combustion mode of the internal combustion engine at time of driving the vehicle.

14. The power generation control system according to claim 8, wherein the combustion mode is changed between a stratified combustion mode and a homogeneous combustion mode or between a stoichiometric combustion mode and a lean combustion mode based on the operational condition.

15. A power generation control method for an internal combustion engine of a vehicle, which changes a combustion mode based on an operational condition, the power generation control method comprising:

operating the internal combustion engine in one of a plurality of combustion modes; and operating a power generator in a manner that maintains the current combustion mode of the internal combustion engine.

16. The power generation control method according to claim 15, further comprising:

predicting a noxious component output quantity in exhaust gas of the internal combustion engine in a generator operating state where power generation of the power generator is performed during operation of the internal combustion engine;

predicting a noxious component output quantity in the exhaust gas of the internal combustion engine in a generator non-operating state where the power generation of the power generator is stopped during the operation of the internal combustion engine; and predicting a noxious component output quantity increase in exhaust gas of the internal combustion engine caused by the power generation of the power generator based on a difference between the noxious component output quantity in the generator operating state and the noxious component output quantity in the generator non-operating state; and controlling the power generation quantity of the power generator in view of the noxious component output quantity increase in the manner that maintains the current combustion mode of the internal combustion engine.

17. The power generation control method according to claim 15, further comprising:

predicting a fuel consumption quantity of the internal combustion engine in a generator operating state where power generation of the power generator is performed during operation of the internal combustion engine; and predicting a fuel consumption quantity of the internal combustion engine in a generator non-operating state where the power generation of the power generator is stopped during the operation of the internal combustion engine;

predicting a fuel consumption quantity increase of the internal combustion engine caused by the power generation of the power generator based on a difference between the fuel consumption quantity in the generator operating state and the fuel consumption quantity in the generator non-operating state; and controlling the power generation quantity of the power generator in view of the fuel consumption increase in the manner that maintains the current combustion mode of the internal combustion engine.

18. The power generation control method according to claim 15, further comprising:

determining whether priority should be given to charging of the battery over maintaining of the current combustion mode based on a remaining electric charge of the battery; and controlling the power generation quantity of the power generator without requiring the maintaining of the current combustion mode of the internal combustion engine when it is determined that the priority should be given to the charging of the battery over the maintaining of the current combustion mode.

19. The power generation control method according to claim 15, further comprising:

determining whether priority should be given to generating of the electric power by the power generator over maintaining of the current combustion mode based on an electric power consumption in the vehicle; and controlling the power generation quantity of the power generator without requiring the maintaining of the current combustion mode of the internal combustion engine when it is determined that the priority should be given to the generating of the electric power by the power generator over the maintaining of the current combustion mode.

20. The power generation control method according to claim 15, wherein the operating of the power generator is performed in the manner that maintains the current combustion mode of the internal combustion engine at time of driving the vehicle.

21. The power generation control method according to claim 15, wherein the combustion mode is changed between a stratified combustion mode and a homogeneous combustion mode or between a stoichiometric combustion mode and a lean combustion mode based on the operational condition.

* * * * *